Feb. 2, 1960 T. M. GORDON, JR., ET AL 2,923,781
SYSTEM FOR CONTINUOUSLY RECORDING
SOUND ON FILM PHOTOGRAPHICALLY
Filed Dec. 10, 1953 2 Sheets-Sheet 1
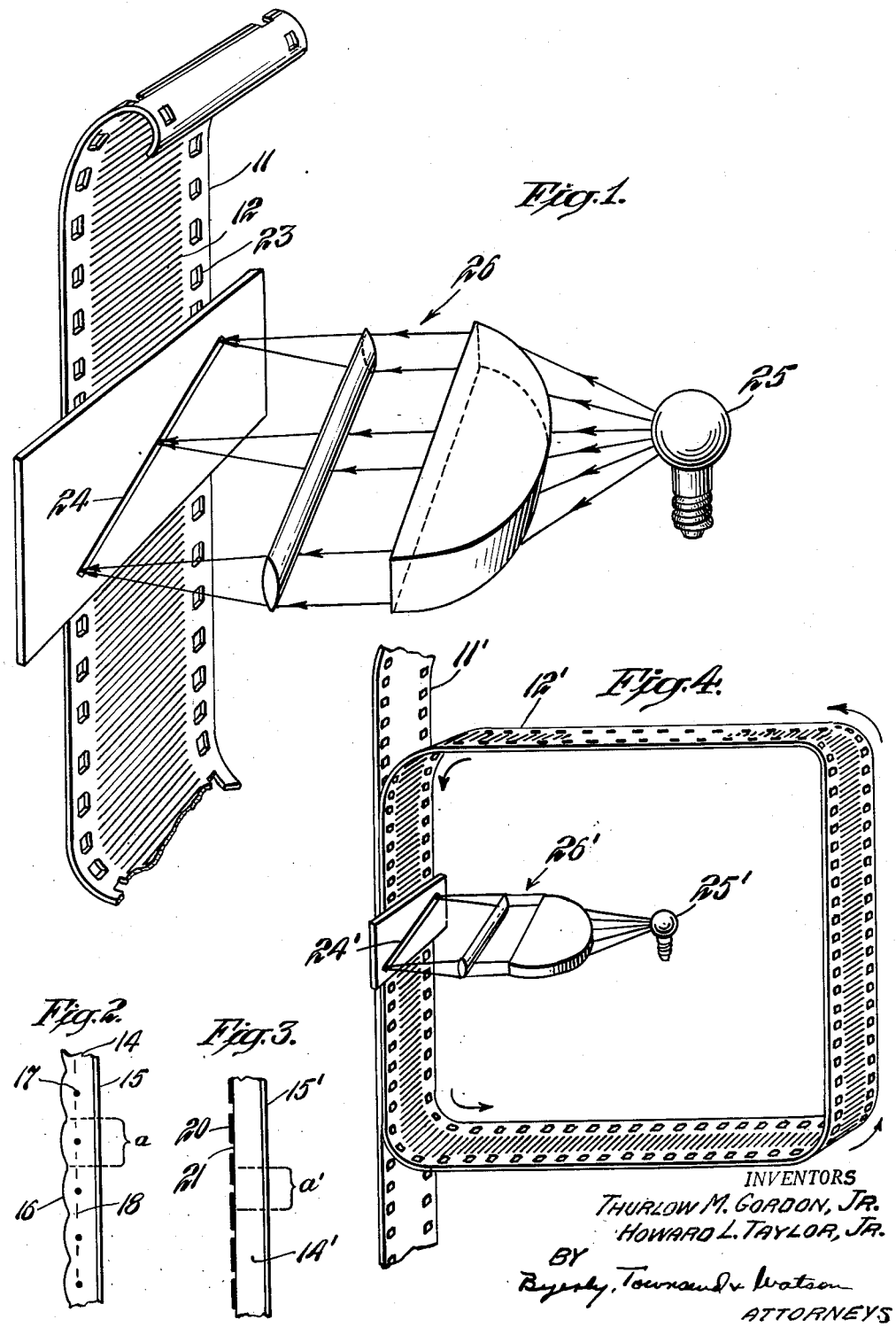
INVENTORS
THURLOW M. GORDON, JR.
HOWARD L. TAYLOR, JR.
BY
Byerly, Townsend & Watson
ATTORNEYS Feb. 2, 1960 T. M. GORDON, JR., ET AL 2,923,781
SYSTEM FOR CONTINUOUSLY RECORDING
SOUND ON FILM PHOTOGRAPHICALLY
Filed Dec. 10, 1953 2 Sheets-Sheet 2
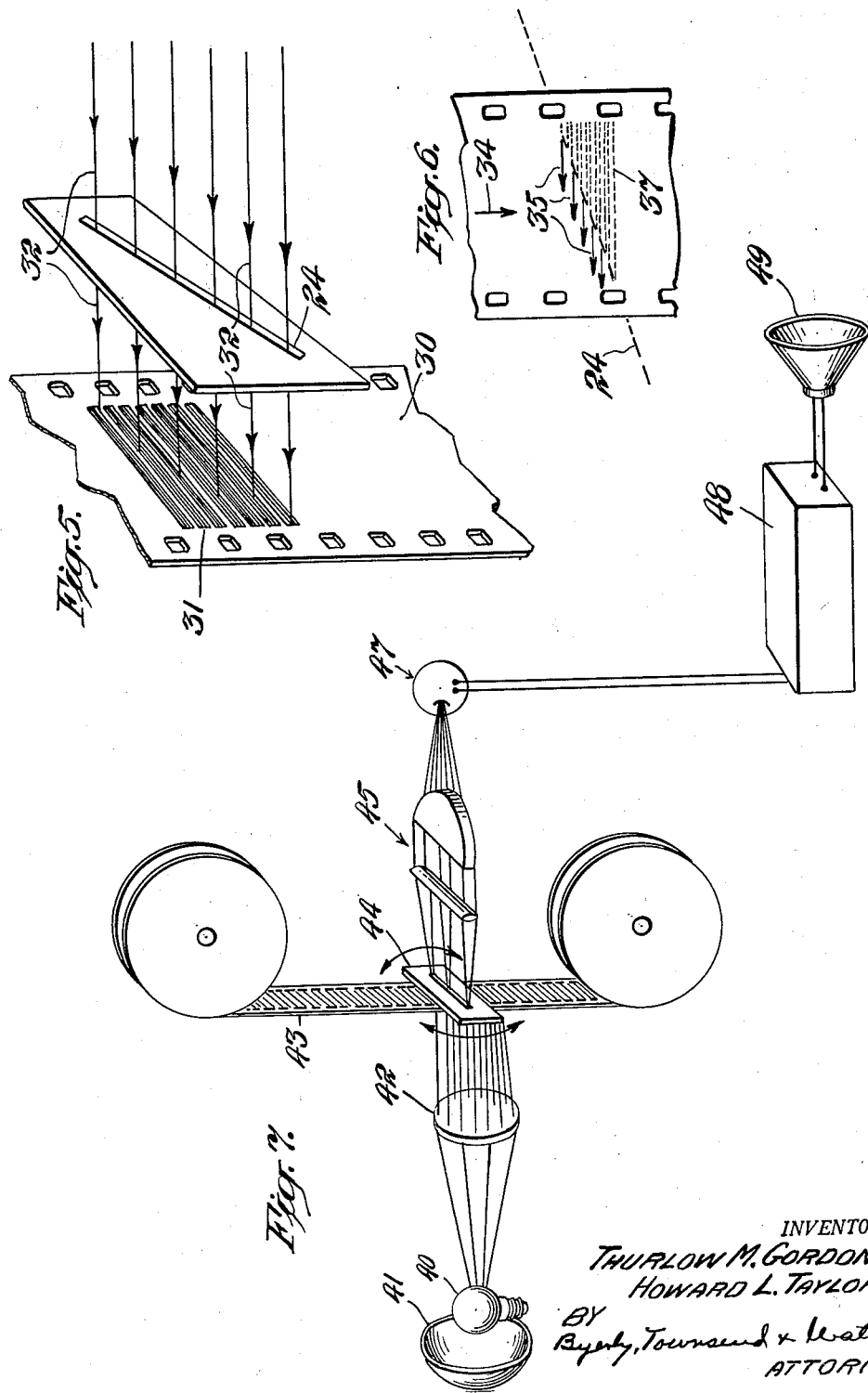
INVENTORS
THURLOW M. GORDON, JR.
HOWARD L. TAYLOR, JR.
BY
Byerly, Townsend & Watson
ATTORNEYS

United States Patent Office 2,923,781
Patented Feb. 2, 1960

2,923,781

SYSTEM FOR CONTINUOUSLY RECORDING SOUND ON FILM PHOTOGRAPHICALLY

Thurlow M. Gordon, Jr., Brookfield, and Howard L. Taylor, Jr., Brookfield Center, Conn.

Application December 10, 1953, Serial No. 397,402

8 Claims. (Cl. 179—100.3)

This invention relates to sound recording and aims to provide an improvement in the system for continuously recording sound on film photographically.

It is a particular feature of our invention that it may be employed with advantage in the production of motion pictures. In the motion picture industry, a sound track is recorded upon film bearing a light-sensitive coating by causing the film to travel past a recording aperture slit adapted to admit modulated light to the film. Frequency response of sound which has been recorded photographically in this manner is dependent upon the rate at which the film is exposed. In the past, the rate of exposure has been the same as the rate at which the film travelled past the recording aperture slit. This has imposed a serious limitation upon sound recording in the motion picture industry.

The speed at which film can be conveyed past a recording aperture slit in motion picture production is governed by the frame repetition rate employed in the projection of the picture. For 35 mm. motion picture film, the linear motion of the film at 24 frames per second produces approximately 18 inches per second of uniform film motion which is available for the purpose of recording sound. Even with a very small recording slit, this rate does not permit of recording the highest sound frequencies which it would be desirable to reproduce. With a recording aperture slit two thousandths of an inch wide, the highest recorded frequency response at such a rate cannot possibly exceed nine thousand cycles and, in practice, it would be somewhat less due to various forms of degradation of the image.

We have discovered that it is possible to record sound on film photographically at a velocity which is in excess of the rate at which the film is conveyed past a recording aperture slit and thus overcome the foregoing limitation. According to our new method, the strip of film is exposed by first subdividing the light-sensitive coating into a series of parallel, discrete, narrow, generally transverse units and then causing the successive members of the series to be swept lengthwise by a thin line of modulated light. This can be accomplished, pursuant to our invention, through the use of a screen interposed between the light-sensitive coating of the film and the recording aperture slit. The screen is adapted to confine the points at which the line of light from the aperture slit is permitted to reach the light-sensitive coating to a series of narrow, parallel, discrete, generally transverse units and is conveyed with the film past the recording aperture slit so that the line of modulated light admitted through that slit extends across the film at an acute angle to the generally transverse units.

In order that our invention will be clearly understood by those skilled in the art, we will describe the practice of our new method of recording sound on film photographically by means of the apparatus illustrated diagrammatically in the accompanying drawings in which:

Fig. 1 is an isometric view of a portion of a strip of film bearing a screen on its face and travelling past a recording aperture slit;

Fig. 2 is a transverse section, greatly enlarged, of a fragment of film whose face is provided with a screen of the cylindrical lenticule type;

Fig. 3 is a transverse section, greatly enlarged, of a fragment of film whose face bears a screen of the grating type;

Fig. 4 is an isometric view of a separate screen travelling with a strip of film past a recording aperture slit;

Fig. 5 is an isometric view illustrating the way in which the line of light admitted to film through the recording aperture slit intersects the film at an acute angle;

Fig. 6 is a plan view of a portion of a strip of film illustrating the progress of exposure of the film; and Fig. 7 is an isometric view of a system for reproducing sound which has been recorded photographically according to our invention.

In the practice of our invention we prefer to employ a film 11 whose face is provided with an integral screen 12. That screen may be of the lenticular type illustrated in Fig. 2 or the grating type illustrated in Fig. 3. The film illustrated in Fig. 2 consists of a strip of flexible transparent material 14 whose rear surface bears a coating 15 of light-sensitive photographic emulsion. The face of the strip 14 has a series of transverse corrugations 16, each of which constitutes a cylindrical lenticule. The lenticules 16 can be formed on the face of the strip 14 by various methods such as, for example, embossing or molding. The lenticules 16 are of uniform curvature with their axes 17 on a common plane 18 and with their focal plane along the light-sensitive coating 15. The lenticules 16 subdivide the light-sensitive coating into a series of discrete units $a$.

The film illustrated in Fig. 3 is provided with a screen of the grating type. It consists of a strip of flexible material 14' whose rear surface bears a light-sensitive coating 15'. The face of the film contains opaque transverse bands 20 separated by transparent areas 21 to provide a series of discrete units $a'$.

The film 11 is preferably provided with sprocket holes 23 through which it can be moved by conventional mechanism (not shown) past a recording aperture slit 24. Modulated light from a source 25 is focused, by an optical system indicated generally at 26, uniformly over the entire length of recording aperture slit 24 and, as film 11 moves past that aperture slit, it is exposed. It will be appreciated that, when an exceedingly fine line of light is desired for exposure, a cylindrical lens may be substituted for slit 24.

The screen 12 is interposed between the recording aperture slit 24 and the light-sensitive coating 15 or 15'. Consequently, the points at which light passing through the aperture slit may reach the coating are limited to those points at which, in the case of a lenticular screen, the lenticules 16 concentrate the light, or, in the case of a grating screen, the points behind the transparent areas 21.

The recording aperture slit 24 is disposed at a diagonal to the path of travel of the film 11. The dimensions of slit 24 and of film units $a$ or $a'$, and the angle at which slit 24 is disposed with respect to those units are preferably such that the line of light admitted through slit 24 intersects several units $a$ or $a'$ at once. As a consequence, the light reaching coating 15 or 15' at any given moment during the path of travel of film 11 past aperture slit 24 is limited to a series of points extending along a diagonal line across the film and representing the line of intersection of the light admitted through aperture slit 24 with the screen elements 16 or 21. This is illustrated in Fig. 5 which shows a portion of a strip of film 30 bearing on its face a screen 31 of the grating type. The light passing through the aperture slit 24 is represented by lines 32. The dimensions of the elements of screen 31 and the angle of inclination to the path of film 30 of the slit 24 are such that light passes through screen 31 to reach the light-sensitive coating on the rear surface of the film at spaced points (six being shown in the example of Fig. 5) at each of which an identical photographic record is created and it is not possible for any such point to be exposed more than once. As the film progresses past aperture 24, the point at which light admitted through the aperture reaches a film unit $a$ or $a'$ shifts along that unit from one side of the film to the other. This is illustrated in Fig. 6 wherein the orientation of the recording slit aperture 24 is illustrated by a broken line and the film is represented as traveling in the direction indicated by arrow 34. The portions of the film which have been exposed to light represented by the arrows 35 are located in the shaded area 37.

When the rate of travel of film 11 past a recording aperture slit 24 is constant, the velocity at which the point of intersection of the aperture 24 with a film unit $a$ or $a'$ will move along that unit is a function of the cotangent of the angle of the aperture slit with respect to such film unit. For instance, when aperture slit 24 intersects film units $a$ or $a'$ at an angle of 45°, the velocity at which the point of intersection will move across said units is equal to the rate of film travel. As this angle is decreased, the velocity increases as a function of the cotangent, theoretically approaching infinity as the angle approaches 0°. Therefore, a conventional film speed is capable of recording at an effective rate of exposure velocity many times greater than the linear speed of the film past the recording slit aperture. Hence, the rate at which a photographic record can be made upon the film units $a$ or $a'$ may be controlled by adjusting the angle of intersection of aperture 24 with those units without varying the speed of film 11.

It is not essential in the practice of our invention that the screen employed to subdivide the light-sensitive coating of the film into a series of discrete units be integral with the film. As illustrated in Fig. 4, a separate screen 12' can be caused to travel with film 11' past the recording aperture slit 24'. Light from a source 25' is focused uniformly across the length of slit 24' by means of an optical system indicated generally at 26'. So long as the screen 12' travels in synchronism with film 11' past slit 24', the action thereof is the same as that described above in connection with screen 12.

Sound which has been recorded photographically upon film in accordance with our invention can be reproduced by means of apparatus such as that illustrated diagrammatically in Fig. 7. It includes a light source 40 which, in conjunction with reflector 41 and an optical system 42, is adapted to provide a high intensity illumination over the film 43 as it travels past aperture slit 44. The aperture slit 44 is constructed in such a manner that the angular position thereof may be adjusted to correspond with that of the diagonal recording aperture slit 17 employed when the film was exposed. A second optical system indicated generally at 45 receives the light which passes through the diagonal aperture slit 44 after passing through the film 43 and concentrates it on the sensitive area of the photocathode of a photoelectric cell 47. The photoelectric cell is associated with an amplifier 48 in conventional manner and controls the output of the loud speaker 49.

When sound which has been recorded photographically on film in accordance with our invention is reproduced, it is not necessary that a screen move in synchronism with the exposed and developed film. Exposure of the film has created a record on a series of discrete bands which have become regions of variable light transmission upon the development of the film. These areas of variable light transmission may be positive images or negative images, depending upon the requirements of the entire process. They are presented to the diagonal aperture slit 44 in the same sequence as when they were exposed.

It is a further feature of our invention that sound can be recorded photographically on pre-selected portions of a film and the balance of the film can be utilized to record a picture as described in our pending application Serial No. 225,632 filed May 10, 1951, now Patent No. 2,823,578, or to record another sound track. This is accomplished by means of an integral screen of the cylindrical lenticule type. When such a screen is used, the modulated light from source 25 and the optical system 26 can be tilted about an axis in common with the recording aperture slit 24 to cause light admitted to the light-sensitive coating 15 to be shifted by parallax along a limited portion of unit $a$, the location of the exposure being determined by the angle of tilt. The balance of unit $a$ is then available for recording a second sound track or a motion picture, in which case a non-intermittent motion picture can be produced wherein both the picture record and the sound record extend across the entire film, so disposed that neither interferes with the other.

The terms which we have used in describing our invention are terms of description and not of limitation and it will be appreciated that various modifications may be made in the preferred method of practicing our invention which has been set forth above without departing from the spirit of our invention as it is described in the appended claims. For instance, the recording aperture slit 24 may be disposed perpendicular to the path of the film 11 in which event units $a$ or $a'$ may be disposed at an acute angle thereto.

What is claimed is:

1. A system for recording sound on film photographically at a substantially constant rate of speed which comprises a film having a light-sensitive coating, a recording aperture slit adapted to admit a thin line of modulated light to said film, a screen located between the aperture slit and said light-sensitive coating to confine the points at which light is permitted to reach the light-sensitive coating to a series of parallel, discrete, narrow, generally transverse units, and means for continuously moving the screen and film past said aperture slit so that the line of light admitted thereby extends across the film at an acute angle to said units.

2. A system for recording sound on film photographically at a substantially constant rate of speed which comprises a film having a light-sensitive coating, a recording aperture slit adapted to admit a thin line of modulated light to said film, a screen located between the aperture slit and said light-sensitive coating to confine the points at which light is permitted to reach the light-sensitive coating to a series of parallel, discrete, narrow, generally transverse units, and means for continuously moving the screen and film past said aperture slit so that the line of light admitted thereby extends across the film at an acute angle and always intersects at least one of said units.

3. A system for recording sound on film photographically at a substantially constant rate of speed which comprises a film having a light-sensitive coating, a recording aperture slit adapted to admit a thin line of modulated light to said film, a screen located between the aperture slit and said light-sensitive coating to confine the points at which light is permitted to reach the light-sensitive coating to a series of parallel, discrete, narrow, generally transverse units, and means for continuously moving the screen and film past said aperture slit so that the line of light admitted thereby extends across the film and always intersects a plurality of said units at an acute angle.

4. A system for recording sound on film photographically at a substantially constant rate of speed which comprises a film having a light-sensitive coating, a recording aperture slit adapted to admit a thin line of modulated light to said film, a screen located between the aperture slit and said light-sensitive coating to confine the points at which light is permitted to reach the coating to a series of parallel, discrete, narrow, generally transverse units, means for continuously moving the screen and film past said aperture slit so that the line of light admitted thereby extends across the film at an angle to said units and sweeps along the length of said units, and means for regulating the angle at which the line of light intersects said units whereby the speed at which the line of light sweeps along the length of said units is controlled.

5. A system for recording sound on film photographically at a substantially constant rate of speed which comprises a film having a coating of light-sensitive material on its rear surface and a screen formed on its face adapted to subdivide said coating into a series of parallel, discrete, narrow, generally transverse units, a recording aperture slit adapted to admit a thin line of modulated light to said film so that it intersects said units at an acute angle and means for continuously moving said film past said aperture slit.

6. A system for recording sound on film photographically at a substantially constant rate of speed which comprises a film having a coating of light-sensitive material on its rear surface and a cylindrical lenticule screen on its face, a recording aperture slit adapted to admit a thin line of modulated light to said film so that it intersects the cylindrical lenticules of said screen at an acute angle, and means for continuously moving said film past said aperture slit.

7. A system for recording sound on film photographically at a substantially constant rate of speed which comprises a film having a coating of light-sensitive material on its rear surface and bearing on its face a grating screen comprising a series of parallel opaque elements separated by narrow transverse areas, a recording aperture slit adapted to admit a thin line of modulated light to said film so that it intersects the transparent areas of said grating screen at an acute angle, and means for continuously moving said film past said aperture slit.

8. A system for recording sound on film photographically at a substantially constant rate of speed which comprises a film having a coating of light-sensitive material on its rear surface and a screen consisting of a series of generally transverse cylindrical lenticules on its face adapted to subdivide said coating into a series of discrete units, a recording aperture slit adapted to admit a thin line of modulated light to said film so that it intersects said lenticules at an acute angle, and means for continuously moving said film past said aperture slit so that a predetermined portion of each of said units is exposed to said line of light.

References Cited in the file of this patent

UNITED STATES PATENTS

| | | |
|---|---|---|
| 1,540,318 | Dunajeff | June 2, 1925 |
| 1,640,557 | Tykociner | Aug. 30, 1927 |
| 1,917,653 | Kroesen | July 11, 1933 |
| 1,928,953 | Simpson | Oct. 13, 1933 |
| 2,351,032 | Gabor | June 3, 1944 |